US012687857B2

(12) United States Patent
Huang

(10) Patent No.: US 12,687,857 B2
(45) Date of Patent: Jul. 21, 2026

(54) CONTROL METHOD FOR MOVABLE PLATFORM, HEAD-MOUNTED DEVICE, SYSTEM, AND STORAGE MEDIUM

(71) Applicant: SZ DJI TECHNOLOGY CO., LTD., Shenzhen (CN)

(72) Inventor: Min Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 16 days.

(21) Appl. No.: 18/774,907

(22) Filed: Jul. 16, 2024

(65) Prior Publication Data

US 2024/0370031 A1 Nov. 7, 2024

Related U.S. Application Data

(63) Continuation of application No. PCT/CN2022/073545, filed on Jan. 24, 2022.

(51) Int. Cl.
*G05D 1/617* (2024.01)
*G05D 1/224* (2024.01)
(Continued)

(52) U.S. Cl.
CPC ........... *G05D 1/617* (2024.01); *G05D 1/2249* (2024.01); *H04N 7/181* (2013.01); *H04N 23/635* (2023.01); *G05D 2109/20* (2024.01)

(58) Field of Classification Search
CPC .. G05D 1/617; G05D 1/2249; G05D 2109/20; G05D 1/2248; G05D 1/227; H04N 7/181; H04N 23/635; G02B 27/01
(Continued)

(56) References Cited

U.S. PATENT DOCUMENTS

| 7,496,140 B2 * | 2/2009 | Winningstad ........ G11B 27/105 |
| | | 348/148 |
| 10,719,087 B2 * | 7/2020 | Zhang ................... G06V 20/13 |

(Continued)

FOREIGN PATENT DOCUMENTS

| CN | 105572870 A * | 5/2016 |
| CN | 107428411 A | 12/2017 |

(Continued)

OTHER PUBLICATIONS

International Search Report for PCT/CN2022/073545 (May 31, 2022).

*Primary Examiner* — Asmamaw G Tarko

(57) ABSTRACT

A method for controlling a movable platform includes: displaying a first image and/or a second image on a display device of a head-mounted device, where the first image is captured by a first photographing device on the head-mounted device and the second image is captured by a second photographing device on the movable platform; when switching from displaying the second image to displaying the first image on the display device, sending a safety operation instruction to the movable platform to make the movable platform perform a corresponding safety operation. This disclosure ensures the safety of the movable platform during interactions between the head-mounted device and the movable platform, particularly when the content displayed by the head-mounted device changes. The disclosure also provides a terminal device and a head-mounted device.

20 Claims, 5 Drawing Sheets

100

Display a first image and/or a second image on a display device of a head-mounted device, the first image is an image captured by a first photographing device on the head-mounted device, and the second image is an image captured by a second photographing device on a movable platform ⟍S110

When switching from displaying the second image to displaying the first image on the display device, send a safety operation command to the movable platform to make the movable platform perform a corresponding safety operation ⟍S120

(51) Int. Cl.
G05D 109/20 (2024.01)
H04N 7/18 (2006.01)
H04N 23/63 (2023.01)

(58) Field of Classification Search
USPC .......................................................... 348/144
See application file for complete search history.

(56) References Cited

U.S. PATENT DOCUMENTS

| | | | | |
|---|---|---|---|---|
| 2017/0010850 | A1* | 1/2017 | Kobayashi | G02B 27/0172 |
| 2018/0120900 | A1* | 5/2018 | Takahashi | H04N 7/185 |
| 2019/0307196 | A1* | 10/2019 | Stabel | A42B 3/30 |
| 2022/0066477 | A1* | 3/2022 | Shi | G05D 1/0027 |

FOREIGN PATENT DOCUMENTS

| | | |
|---|---|---|
| CN | 108731681 A | 11/2018 |
| WO | 2021134575 A1 | 7/2021 |
| WO | 2021237625 A1 | 12/2021 |

* cited by examiner

100

Display a first image and/or a second image on a display device of a head-mounted device, the first image is an image captured by a first photographing device on the head-mounted device, and the second image is an image captured by a second photographing device on a movable platform ⟶ S110

When switching from displaying the second image to displaying the first image on the display device, send a safety operation command to the movable platform to make the movable platform perform a corresponding safety operation ⟶ S120

FIG. 1

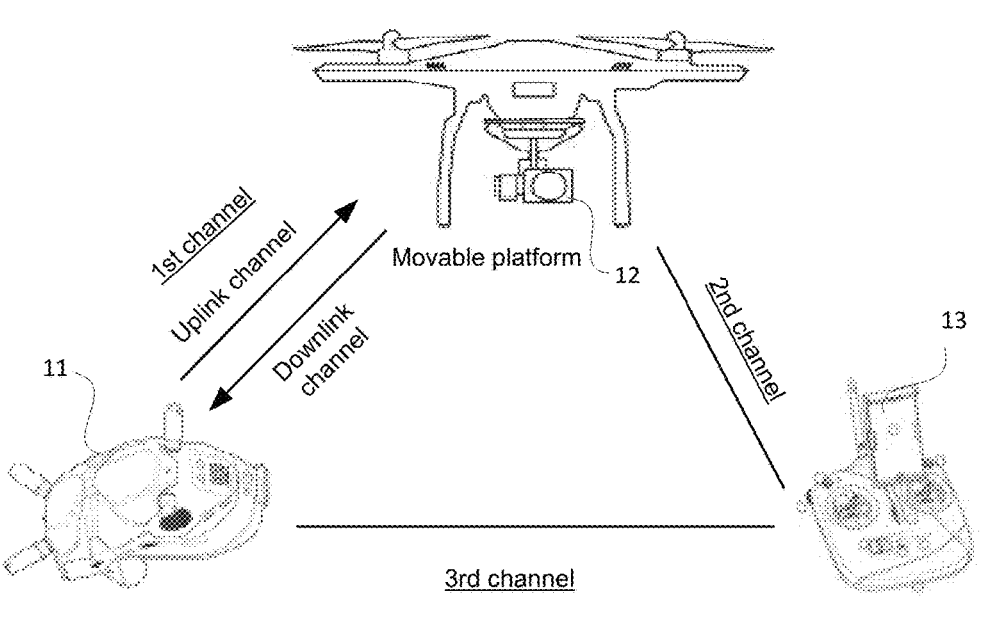

| Obtain an operational state of a movable platform | S210 |

| Based on the operational state of the movable platform, display the first image and/or the second image on the display device of the head-mounted device, the first image is captured by the first photographing device on the head-mounted device, and the second image is captured by the second photographing device on the movable platform | S220 |

| Send a control instruction to the movable platform based on a control operation from a user | S230 |

FIG. 6

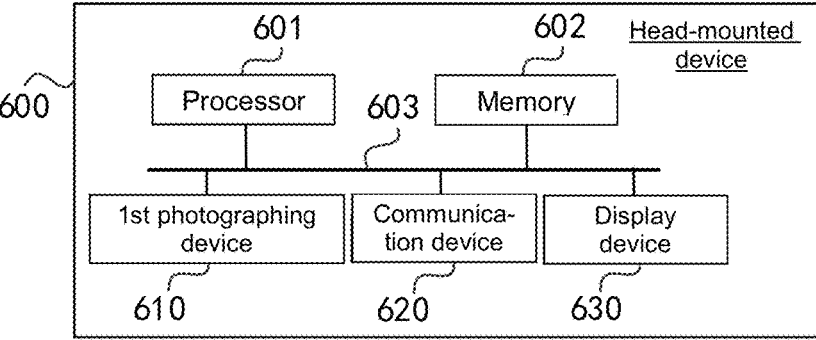

CONTROL METHOD FOR MOVABLE PLATFORM, HEAD-MOUNTED DEVICE, SYSTEM, AND STORAGE MEDIUM

RELATED APPLICATIONS

This application is a continuation application of PCT application No. PCT/CN2022/073545, filed on Jan. 24, 2022, and the content of which is incorporated herein by reference in its entirety.

COPYRIGHT NOTICE

TECHNICAL FIELD

The present disclosure relates to the technical field of movable platforms, and in particular to a control method for a movable platform, a head-mounted device, a system and a storage medium.

BACKGROUND

A head-mounted device is a portable device that can be directly worn by a user. It can achieve powerful functions through software support and data interaction, greatly facilitating people's lives, learning, and perception.

Head-mounted devices include examples such as Augmented Reality (AR) glasses, Virtual Reality (VR) glasses, flight control glasses, smart helmets, smart headbands, and others. These devices can obtain images taken by a movable platform and display them on their screens, allowing users to experience the viewpoint of the movable platform from a first-person perspective/viewpoint, giving a sense of immersion. Some head-mounted devices can also display images captured by the device's camera, enabling users to understand their surrounding environment. However, when the displayed content changes, it is difficult to ensure the safety of the movable platform.

SUMMARY

The present disclosure provides a control method for a movable platform, a head-mounted device, a system and a storage medium, with the object of addressing the issue of ensuring the safety of the movable platform when it interacting with a head-mounted device, particularly when the displayed content on the head-mounted device changes.

In a first aspect, the present disclosure provides a control method for a movable platform, including: controlling a display device of a head-mounted device to display at least one of a first image or a second image, where the head-mounted device is configured to be in communication with the movable platform, the first image is an image captured by a photographing device on the head-mounted device, and the second image is an image captured by a photographing device on the movable platform; and in response to the display device switching from displaying the second image to displaying the first image, generating a safety operation instruction to enable the movable platform to perform a corresponding safety operation.

In a second aspect, the present disclosure provides a terminal device, including: a communication device configured to communicate with a head-mounted device, where the head-mounted device is configured to communicate with a movable platform; at least one storage medium storing at least one set of instructions; and at least one processor in communication with the at least one storage medium, where during operation, the at least one processor executes the at least one set of instructions to cause the terminal device to at least: control a display device of the head-mounted device to display at least one of a first image or a second image, where the first image is an image captured by a photographing device on the head-mounted device, and the second image is an image captured by a photographing device on the movable platform, and in response to the display device switching from displaying the second image to displaying the first image, generate a safety operation instruction to enable the movable platform to perform a corresponding safety operation.

In a third aspect, the present disclosure provides a head-mounted device, including: a photographing device on the head-mounted device, configured to capture a first image; a communication device, configured to communicate with a movable platform to receive a second image captured by a photographing device on the movable platform; a display device, configured to display at least one of the first image or the second image; at least one storage medium storing at least one set of instructions; and at least one processor in communication with the at least one storage medium, where during operation, the at least one processor executes the at least one set of instructions to cause the head-mounted device to at least: control the display device of the head-mounted device to display at least one of the first image or the second image, where the first image is an image captured by a photographing device on the head-mounted device, and the second image is an image captured by a photographing device on the movable platform, and in response to the display device switching from displaying the second image to displaying the first image, generate a safety operation instruction to enable the movable platform to perform a corresponding safety operation.

Embodiments of the present disclosure provide a control method for a movable platform, a terminal device and a head-mounted device. The method includes: controlling a display device of a head-mounted device to display at least one of a first image or a second image, where the head-mounted device is configured to be in communication with the movable platform, the first image is an image captured by a photographing device on the head-mounted device, and the second image is an image captured by a photographing device on the movable platform; and in response to the display device switching from displaying the second image to displaying the first image, generating a safety operation instruction to enable the movable platform to perform a corresponding safety operation. By displaying the first image and/or the second image on the display device of the head-mounted device, it is convenient for a user to understand the environment around the user and/or the movable platform, and control the movable platform to perform tasks such as adjusting its attitude by control operations, thereby improving the user's sense of safety. Additionally, controlling the movable platform to perform the corresponding safety operation when switching to display the first image can enhance the safety of the movable platform.

It should be understood that the above general description and the detailed description that follows are merely exemplary and explanatory and do not limit the disclosed content of the present disclosure.

BRIEF DESCRIPTION OF THE DRAWINGS

In order to clearly illustrate the technical solutions of the embodiments of the present disclosure, the following will briefly introduce the drawings for the description of some exemplary embodiments. Apparently, the accompanying drawings in the following description are some exemplary embodiments of the present disclosure. For a person of ordinary skill in the art, other drawings may also be obtained based on these drawings without creative efforts.

FIG. 1 illustrates a control process 100 for a movable platform according to some exemplary embodiments of the present disclosure;

FIG. 2 is a schematic diagram of data transmission between a head-mounted device and a movable platform;

FIG. 6 illustrates a control process 600 for a movable platform according to some exemplary embodiments of the present disclosure;

FIG. 7 is a schematic block diagram of a head-mounted device according to some exemplary embodiments of the present disclosure.

DETAILED DESCRIPTION

Figure 3:
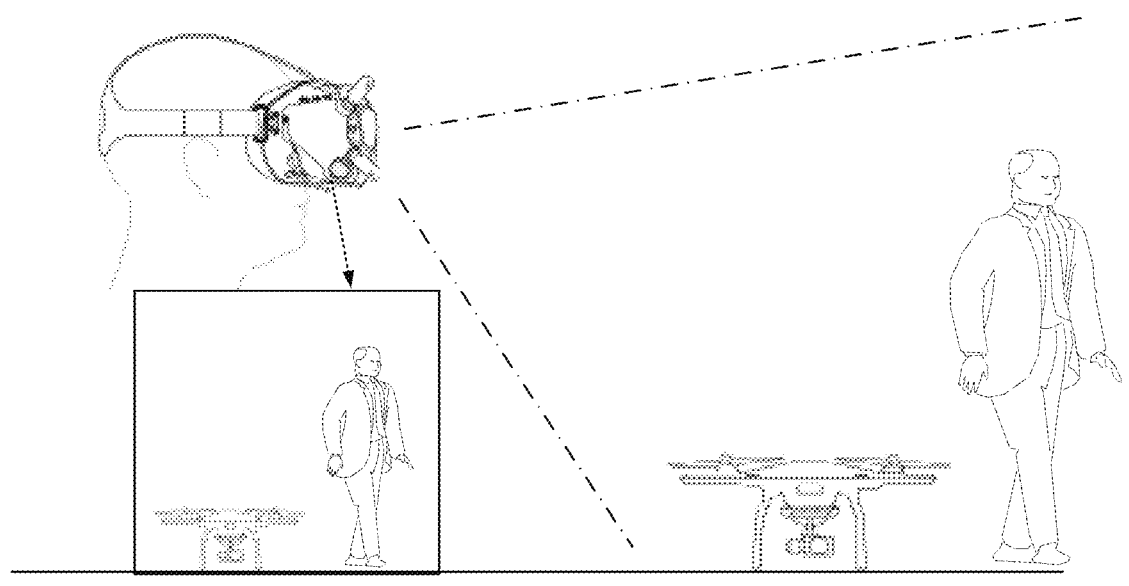
FIG. 3 is a schematic diagram of a display device showing a first image according to some exemplary embodiments of the present disclosure.

The technical solutions in some exemplary embodiments of the present disclosure will be clearly described below in conjunction with the accompanying drawings. It is apparent that the described embodiments are only part of the embodiments of the present disclosure, not all of them. Based on these exemplary embodiments of the present disclosure, all other embodiments obtained by a person of ordinary skill in the art without creative efforts fall within the scope of protection of the present disclosure.

The flowcharts shown in the accompanying figures are provided as illustrative examples and do not necessarily include all content, operations, or steps. Moreover, they do not mandate execution in the described sequence. For instance, some operations/steps can be decomposed, combined, or partially combined, allowing flexibility in the actual execution order depending on circumstances.

With reference to the figures, detailed description of some exemplary embodiments of the present disclosure will be provided. Unless conflicting, features from the following examples and embodiments can be combined with each other.

Referring to FIG. 1, FIG. 1 illustrates a control process 100 for a movable platform according to some exemplary embodiments of the present disclosure. Some or all aspects of the process 100 (or any other processes described herein, or variations and/or combinations thereof) may be performed by one or more processors onboard a movable object, a remote control device, any other system or device or a combination thereof. Some or all aspects of the process 100 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes. In some exemplary embodiments, the control process can be applied in terminal devices, for example, the terminal devices may include at least one of mobile phones, tablets, laptops, remote controls, and others. In some exemplary embodiments, the control process can be applied in head-mounted devices. The head-mounted device can be used to display images captured by a first photographing device on the head-mounted device, and/or images captured by a second photographing device on a movable platform, among other processes.

Exemplarily, the head-mounted devices may include at least one of augmented reality (AR) glasses, virtual reality (VR) glasses, flight control glasses, smart helmets, smart headbands, and others.

In some exemplary embodiments, the movable platform may have its own power/driving power device, which can drive the movable platform to move. In some exemplary embodiments, the movable platform requires external equipment to drive its movement. The above is merely an example, and the specific implementation of the movement of the movable platform is not limited in this disclosure. For example, the movable platform may include at least one of an aircraft, vehicle, boat, smart robot, handheld gimbal, sports camera, and others. The movable platform can be manned or unmanned. In some exemplary embodiments, the aircraft includes unmanned aerial vehicles (UAVs). The aircraft can include, but is not limited to, manned aircraft, logistics aircraft, aerial photography aircraft, agricultural plant protection aircraft, industry rescue aircraft, and performance aircraft. The above description merely provides some example, and the types of aircraft are not specifically limited in this disclosure.

Furthermore, UAVs can be rotor-type UAVs, such as quadcopters, hexacopters, and octocopters; alternatively, UAVs can be fixed-wing UAVs.

Furthermore, the head-mounted device communicates with the movable platform. For example, data can be transmitted between the head-mounted device and the movable platform through a wireless channel.

As exemplified in FIG. 2, the wireless channel from the movable platform to the head-mounted device is referred to as a downlink channel, which is used to transmit data collected by the movable platform, such as video, images, sensor data, and telemetry data such as the status information (OSD) of the movable platform, like a UAV.

As exemplified in FIG. 2, the wireless channel from the head-mounted device to the movable platform is referred to as an uplink channel, which is used to transmit remote control data. For example, when the movable platform is an aircraft, the uplink channel is used to transmit flight control instructions and control instructions such as taking photos, recording videos, and returning to home.

In some exemplary embodiments, as shown in FIG. 2, the head-mounted device and the movable platform can transmit data via a terminal device. For example, the terminal device includes at least one of a mobile phone, tablet, laptop, or remote controller. For instance, the data collected by the movable platform can be transmitted to the terminal device, and the terminal device can send the data collected by the movable platform to the head-mounted device via a priority connection or a wireless connection. Similarly, the data from the head-mounted device can be sent to the terminal device, which then sends the data from the head-mounted device to the movable platform.

In some exemplary embodiments, as shown in FIG. 2, the head-mounted device can establish a first channel with the movable platform to enable data transmission between the movable platform and the head-mounted device. For example, the first channel can include an uplink channel and a downlink channel. The head-mounted device can transmit remote control data through the uplink channel and can receive and display image data captured by the photographing device on the movable platform through the downlink channel. In some exemplary embodiments, the head-mounted device can establish the first channel with the movable platform when the terminal device is acting as a relay. In some exemplary embodiments, the head-mounted device can establish the first channel directly with the movable platform without requiring the terminal device as a relay.

In some exemplary embodiments, as shown in FIG. 2, the terminal device can establish a second channel with the movable platform so that the terminal device can send control instructions to the movable platform through the second channel. In some exemplary embodiments, the terminal device can establish the second channel with the movable platform when the head-mounted device is acting as a relay. In some exemplary embodiments, the terminal device can establish the second channel directly with the movable platform without requiring the head-mounted device as a relay.

In some exemplary embodiments, as shown in FIG. 2, the head-mounted device can further establish a third channel with the terminal device so that the head-mounted device can receive control instructions from the terminal device through the third channel and execute corresponding operations based on the control instructions. In some exemplary embodiments, the control instructions include instructions for controlling the head-mounted device to execute menu functions on a virtual operation interface of the head-mounted device. In some exemplary embodiments, the control instructions include movement control instructions for controlling the movable platform, and the head-mounted device can further send the movement control instructions to the movable platform to control its movement.

As shown in FIG. 1, a control method/process of the movable platform in some exemplary embodiments of this disclosure may include steps S110 to S130.

S110: Display a first image and/or a second image on a display device of a head-mounted device. The first image is an image captured by a first photographing device on the head-mounted device, and the second image is an image captured by a second photographing device on a movable platform.

Referring to FIG. 2, the head-mounted device can be equipped with a first photographing device 11. The first photographing device 11 can capture images within a certain range in front of the head-mounted device, and the images captured by the first photographing device 11 can be referred to as the first images. The movable platform is equipped with a second photographing device 12. For example, the second photographing device 12 is mounted on the movable platform via a gimbal. By adjusting the gimbal's attitude, the attitude of the second photographing device 12 can be adjusted so as to change its direction. The images captured by the second photographing device 12 can be referred to as the second images.

Exemplarily, the display device of the head-mounted device may include one or more screens, such as a left-eye display and a right-eye display. The left-eye display and the right-eye display are monitors with display functions, and their specific shapes and structures are not limited. For instance, the left-eye display and the right-eye display can be LCD screens (liquid crystal displays) or OLED screens (organic light-emitting displays). Of course, the specific types of the left-eye display and the right-eye display can also be other types, and the types of the left-eye display and the right-eye display can also be different from each other. The images displayed on the left-eye display and the right-eye display enter the human eyes after being reflected by corresponding optical lenses, allowing the user to see the contents displayed on the left-eye display and the right-eye display. For example, the left eye sees the content displayed on the left-eye display, and the right eye sees the content displayed on the right-eye display. Due to the parallax between the two eyes, a 3D effect can be produced.

In some exemplary embodiments, based on the operational state of the movable platform, the first image and/or the second image can be displayed on the display device of the head-mounted device.

Exemplarily, the operational state of the movable platform includes at least one of the following: stationary state, starting state, cruising state, or returning state.

For example, the operational state of the movable platform can be determined based on at least one of the first image, the second image, and the sensor data collected by a sensor(s) on the movable platform. For instance, the operational state of the movable platform can be determined based on the area of the movable platform in the first image, based on changes in the positions of objects in the second image, or based on the data collected by an attitude sensor on the movable platform. The attitude sensor can include, but is not limited to, at least one of the following: inertial measurement unit (IMU) and visual odometry.

For example, taking the movable platform as a UAV as an example, the stationary state is the state when the UAV has not taken off, such as when the motors used to drive the propellers are not unlocked. The starting state is the state when the UAV takes off and has not flown horizontally or has moved a small distance horizontally, such as when the UAV ascends vertically to a preset height. The cruising state is the state when the UAV is flying horizontally, such as when the UAV is far from the takeoff or landing location. The returning state is the state when the UAV flies back to the takeoff location or towards the landing location, such as when the UAV is close to the takeoff or landing location, like within ten meters.

For example, when the movable platform is in the cruising state, the distance between it and the head-mounted device is greater than or equal to a preset distance threshold. When in the stationary state, starting state, or returning state, the distance between it and the head-mounted device is less than the distance threshold. The preset distance threshold can be 10 meters, but it is not limited to this.

For example, when the movable platform is in the stationary state, the first image is displayed on the display device, and/or when the movable platform is in the starting state, the second image is displayed on the display device.

Exemplarily, referring to FIG. 3 (where the rectangular box in FIG. 3 represents the display interface of the display device), when the movable platform is in the stationary state, the head-mounted device defaults to displaying the first image. This allows a user to perform a safety check of the surrounding environment, making it easier for the user to observe the external environment, which increases safety and convenience. For example, it helps the user understand the positional relationship between the UAV and the user or other objects, allowing for adjustments to the UAV or the placement of other objects, or to remind pedestrians to be cautious and avoid the area. For example, the user can adjust the attitude of the head-mounted device, such as by lowering the head, so that the first photographing device can capture the remote control held by the user. This enables the user to check whether the remote control is being used correctly based on the first image.

For example, when a takeoff instruction is detected and the motors used to drive the propellers on the UAV are unlocked, the movable platform is in the starting state.

Figure 4:
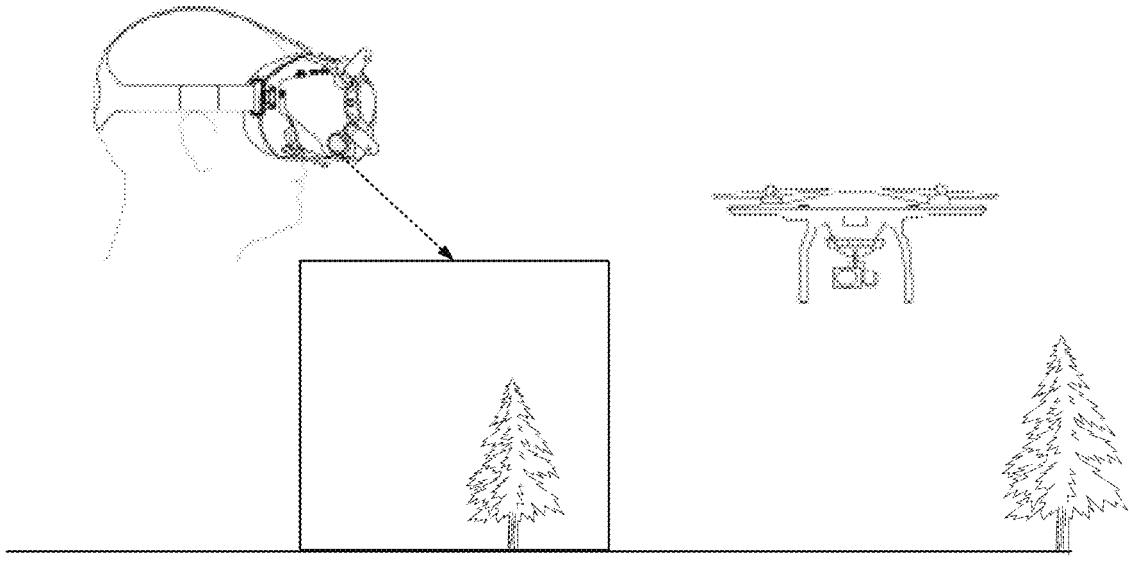
FIG. 4 is a schematic diagram of a display device showing a second image according to some exemplary embodiments of the present disclosure.

For example, referring to FIG. 4 (where the rectangular box in FIG. 4 represents the display interface of the display device), when the movable platform is in the starting state, the display device automatically switches to showing the second image, such as switching to the aircraft's viewpoint. For example, by displaying the second image, the user can assess the UAV's status, such as whether the flight is stable or if there is any shaking in the image captured by the second photographing device. For example, displaying the second image also allows the user to observe whether there are obstacles near the UAV and the positional relationship between the UAV and the obstacles. For instance, if the user determines that there is an obstacle in front of the UAV, they can control the UAV to continue ascending or move left/right to avoid the obstacle during flight.

In some exemplary embodiments, the control method/process further includes: sending a control instruction to the movable platform based on a control operation from the user.

For example, the user's control operation may include a control action detected by the head-mounted device and/or a control action detected by a terminal device such as a remote controller. For instance, the user's control operation may include at least one of a gesture control operation, a voice control operation, or a control element control operation, but is not limited thereto. The control elements include at least one of physical buttons or virtual buttons on the head-mounted device or terminal devices, joysticks, etc.

Specifically, by displaying the first image and/or the second image on the display device of the head-mounted device and sending control instructions to the movable platform based on the user's control operations, the user can understand the environment around and/or within the vicinity of the movable platform. Through these control operations, the user can control the movable platform to perform tasks such as adjusting its attitude, thereby increasing the user's sense of safety and achieving safe control of the movable platform.

S120: When switching from displaying the second image to displaying the first image on the display device, send a safety operation instruction to the movable platform to make the movable platform perform a corresponding safety operation.

In some exemplary embodiments, the safety operation instruction sent to the movable platform makes the movable platform maintain its position, land, or return.

For example, when the movable platform is in the cruising state or returning state, and the display on the display device switches from the second image to the first image, a safety operation instruction is sent to the movable platform to make the movable platform perform the corresponding safety operation.

When the display device of the head-mounted device switches to displaying the first image, the movable platform performs the corresponding safety operation, such as maintaining its current attitude or controlling the UAV to stop. This helps prevent the movable platform from continuing to move and causing potential damage. Additionally, it facilitates the user's ability to quickly understand the attitude of the movable platform and the environment around it when switching back to display the second image, thereby enabling continued control of the movable platform's movement.

In some exemplary embodiments, the displaying of the first image and/or the second image on the display device of the head-mounted device includes: switching from displaying the second image to displaying the first image, or from displaying the first image to displaying the second image based on a viewpoint switching operation of the user.

For example, the viewpoint switching operation includes at least one of the following: a preset head position adjustment, operation on a preset control element, a preset gesture, or a preset voice. For example, the head-mounted device can detect changes in the user's head position, which can be mapped to a viewpoint switching operation, such as lowering the head to trigger the switch from displaying the second image to displaying the first image. For example, the head-mounted device and/or terminal devices like a remote controller can be equipped with control elements. When a user operates a preset control element, a viewpoint switching operation is determined to have been detected. For example, a preset gesture can be detected in the first image to determine if a viewpoint switching operation has been detected. For example, the gesture of extending a hand/five fingers spread out can be used as a preset gesture to trigger the viewpoint switch. For example, the head-mounted device and/or terminal devices like a remote controller can be equipped with a microphone to capture sound. By detecting whether there is a preset voice in the captured sound, a viewpoint switching operation can be determined.

For example, when the movable platform is in the starting state, cruising state, or returning state, the display device can switch from displaying the second image to displaying the first image, or from displaying the first image to displaying the second image based on the user's viewpoint switching operation. For example, when the movable platform is in the starting state, the viewpoint switching operation can switch between displaying the second image or the first image to help the user fully understand the environment around or the environment from the UAV's viewpoint. This enhances the user's sense of safety and improves the safety of operating the movable platform.

For instance, when a takeoff instruction is detected and the UAV's motors are unlocked, the head-mounted device automatically switches to the aircraft's viewpoint and displays the second image so that the user can assess the UAV's status. Before the throttle/power control lever is used to make the UAV fly in the horizontal direction, the user can trigger a viewpoint switch by lowering the head to switch back to the first image, allowing the user to observe the UAV from a third viewpoint during takeoff.

For example, when the movable platform is in the cruising state or returning state, the viewpoint switching operation can switch between displaying the second image or the first image. This helps the user fully understand the environment around or the environment from the UAV's viewpoint, increasing the user's sense of safety and improving the safety of operating the movable platform. For instance, the user shaking the head can trigger the display device to show the first image, and shaking the head again can switch back to displaying the second image, returning to the aircraft's viewpoint.

In some exemplary embodiments, the displaying of the first image and/or the second image on the display device of the head-mounted device includes: when the movable platform is in the cruising state or returning state, displaying the first image and/or the second image on the display device based on a distance between the movable platform and the head-mounted device. By displaying the first image and/or the second image based on the distance between the movable platform and the head-mounted device, the user can better control the UAV and understand the environment around the user and/or near the UAV, thereby enhancing safety and providing a greater sense of safety.

For example, when the movable platform is in the cruising state or returning state, and the distance between the movable platform and the head-mounted device is greater than a first distance threshold, the second image is displayed, and/or when the movable platform is in the cruising state or returning state, and the distance between the movable platform and the head-mounted device is less than the first distance threshold, the first image is displayed.

For example, when the distance between the UAV and the head-mounted device is greater than the first distance threshold, indicating that the UAV is out of the visual range, the second image captured by the photographing device on the UAV is displayed, and this allows the user to experience an immersive flight from the UAV's first-person perspective/ viewpoint. Exemplarily, the first distance threshold can be 10 meters, but it is not limited thereto.

For example, when the distance between the UAV and the head-mounted device is less than the first distance threshold, indicating that the UAV is within the visual range, the first image captured by the photographing device on the head-mounted device is displayed. This helps the user understand the environment around the user and the positional relationship with the UAV, allowing for timely adjustments to the UAV's flight direction, speed, and other parameters to prevent collisions with obstacles and potential harm.

Exemplarily, when the UAV returns to a distance of less than 10 meters from the head-mounted device, the head-mounted device displays the first image, thus switching to the third viewpoint. This allows the user to observe the surrounding environment, confirm safety, and then control the UAV to land safely.

In some exemplary embodiments, the displaying of the first image and/or the second image on the display device of the head-mounted device includes: detecting whether a preset target area is present in the first image, where the preset target area is used to indicate a target object within the field of view of the first photographing device. When the movable platform is in the cruising state or returning state, based on the detection result of whether the preset target area exists in the first image, switching from displaying the second image to displaying the first image on the display device.

For example, the target objects include at least one of the following: pedestrians, animals, vehicles, trees, fences, stairs, or ramps. It is understood that a target object is an entity that presents an obstacle or safety threat to the user's movement and can include both dynamic moving objects and stationary objects.

Figure 5:
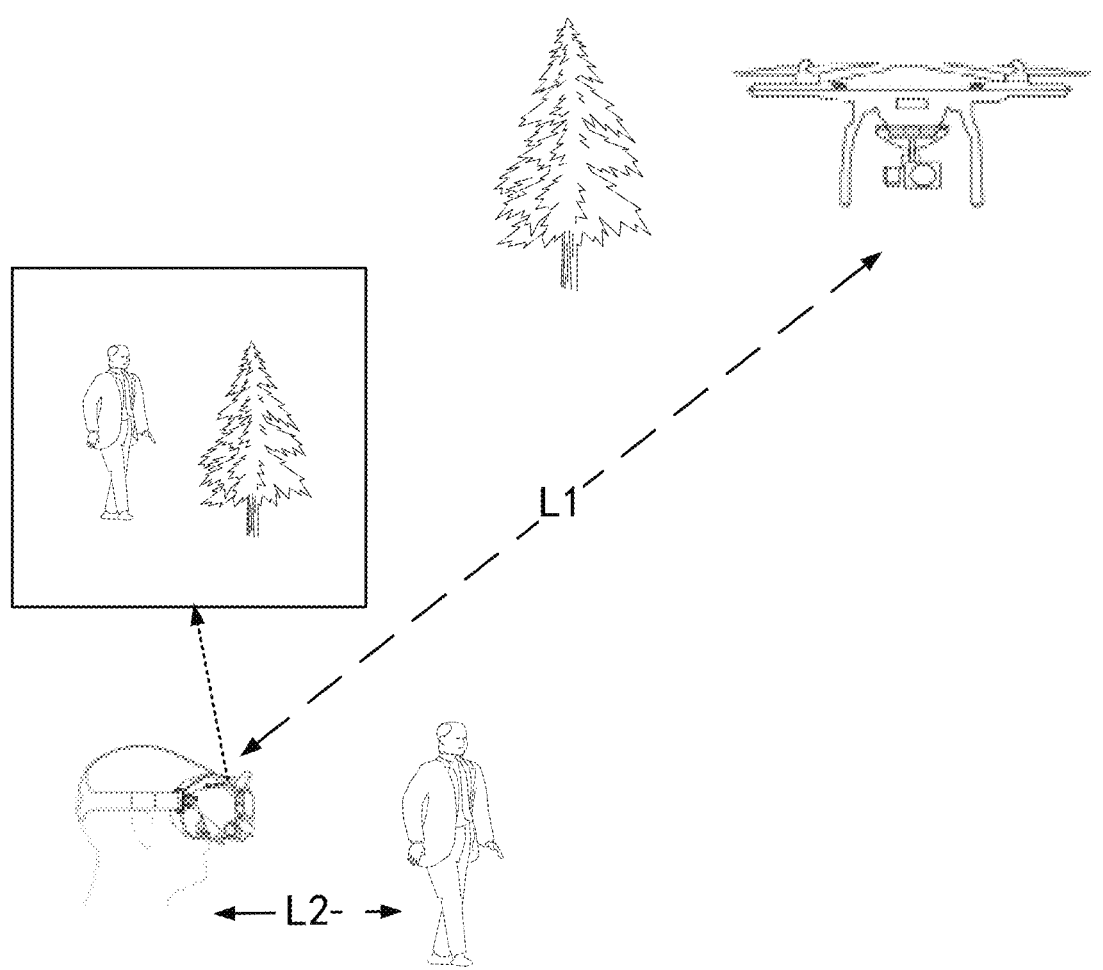
FIG. 5 is a schematic diagram of a display device showing a first image and a second image according to some exemplary embodiments of the present disclosure.

Referring to FIG. 5 (where the rectangular box in FIG. 5 represents the display interface of the display device). If someone passes at a position L2 from the user, a preset target area is detected in the first image captured by the head-mounted device.

In some exemplary embodiments, the displaying of the first image and/or the second image on the display device of the head-mounted device includes: when the movable platform is in the cruising state or returning state, and the distance between the movable platform and the head-mounted device is greater than the first distance threshold, and no preset target area is detected in the first image, the second image is displayed on the display device. For example, when no preset target area is detected in the first image, it can be determined that there are no obstacles or safety threats in front of the user. In this case, the first image does not need to be displayed. By displaying the second image captured by the UAV, the user can experience an immersive flight from the UAV's first-person perspective/ viewpoint.

Exemplarily, when the preset target area is detected in the first image, the display device switches from displaying the second image to displaying the first image. For example, when the second image is displayed on the display device and the preset target area is detected in the first image, at least the first image or the preset target area is displayed on the display device.

Referring to FIG. 5, when the distance L1 between the UAV and the head-mounted device is greater than the first distance threshold, the display device of the head-mounted device shows the second image (including trees), allowing the user to experience immersive flight from the UAV's first-person perspective/viewpoint. When a pedestrian passes at a position L2 from the user, the display device on the head-mounted device shows at least the preset target area, which indicates the presence of a pedestrian within the field of view of the first photographing device. For example, when the preset target area is detected in the first image, it can be determined that there is an obstacle or safety threat in front of the user. By displaying the first image or the preset target area on the display device, the user is alerted to the obstacle or safety threat, such as by preventing the user from moving forward to avoid collisions with the obstacle.

Exemplarily, when the preset target area is detected in the first image, and the distance between the target object indicated by the preset target area and the head-mounted device is less than a second distance threshold, the display device switches from showing the second image to showing the first image. For example, when the distance between the target object and the user is less than the second distance threshold, it can be determined that the target object poses an obstacle or safety threat to the user's movement. By switching to displaying the first image, the user is prompted to avoid the obstacle or safety threat.

Exemplarily, when the distance between the target object indicated by the preset target area and the head-mounted device is greater than or equal to the second distance threshold, the second image is displayed on the display device, along with the first image or the preset target area. For example, when the distance between the target object and the user is greater than or equal to the second distance threshold, it can be determined that although there is a target object in front of the user, the target object is not close enough to affect the user's movement. Therefore, the second image can continue to be displayed on the display device, allowing the user to experience immersive flight from the first-person perspective of the UAV, while simultaneously displaying the first image or the preset target area to help the user understand the spatial relationship between nearby target object and the user. It is understood that the second distance threshold can be referred to as a safety distance, such as 2 meters, but it is not limited thereto.

For example, when the distance between the target object indicated by the preset target area and the head-mounted device is greater than or equal to a third distance threshold, the second image is displayed on the display device. When the distance between the target object indicated by the preset target area and the head-mounted device is greater than or equal to the second distance threshold but less than the third distance threshold, the second image is displayed on the display device, along with the first image or the preset target area. The third distance threshold is greater than the second distance threshold. When the distance between the target object and the user is greater than the third distance threshold, the distance is too far, and the first image is not displayed to prevent interference with the user's immersive flight experience.

Exemplarily, the control method/process further includes: when it is detected that the preset target area exists in the first image and the distance between the target object indicated by the preset target area and the head-mounted device is greater than or equal to the third distance threshold, outputting a prompt message. The prompt message includes at least one of the following forms of information: text, sound, or vibration, indicating to the user that there is a target object at a relatively far distance ahead.

In some exemplary embodiments, when the second image is displayed on the display device, based on at least one of the following: the distance between the movable platform and the head-mounted device, the detection result of whether the preset target area exists in the first image, or the distance between the target object indicated by the preset target area and the head-mounted device, a prompt message is output to allow the user to perform a viewpoint switching operation according to the prompt message. When the user's viewpoint switching operation is detected, the display content on the display device switches from the second image to the first image.

Exemplarily, when the movable platform is in the cruising state or returning state, and the distance between it and the head-mounted device is greater than the first distance threshold, a prompt message is output to the user to confirm whether to switch to displaying the first image.

Exemplarily, when the second image is displayed on the display device and it is detected that the preset target area exists in the first image, a prompt message is output to the user to confirm whether to switch to displaying the first image.

Exemplarily, when the second image is displayed on the display device, and it is detected that the preset target area exists in the first image, and the distance between the target object indicated by the preset target area and the head-mounted device is greater than or equal to the third distance threshold, a prompt message is output to the user to confirm whether to switch to displaying the first image.

Some exemplary embodiments of the present disclosure provides a method/process for controlling a movable platform, including: displaying a first image and/or a second image on a display device of a head-mounted device. The first image is captured by a first photographing device on the head-mounted device, and the second image is captured by a second photographing device on the movable platform. When switching from displaying the second image to displaying the first image on the display device, a safety operation instruction is sent to the movable platform to make it perform the corresponding safety operation. By displaying the first image and/or the second image on the display device of the head-mounted device, it facilitates a user in understanding the environment around the user and/or around the movable platform. This allows the user to control the movable platform to perform tasks such as adjusting its attitude through control operations, thereby enhancing the user's sense of safety. Additionally, by controlling the movable platform to perform the corresponding safety operation when switching to display the first image, the safety of the movable platform is improved.

Referring to the aforementioned embodiments and FIG. 6, which is a schematic flowchart of a control process 600 for a movable platform according to some exemplary embodiments of this disclosure, the control method/process for the movable platform includes steps S210 to S230.

S210: Obtain an operational state of a movable platform.

Exemplarily, the operational state of the movable platform includes at least one of the following: stationary state, starting state, cruising state, and returning state.

For example, considering the movable platform as a UAV, the stationary state is the state when the UAV has not taken off, such as when the UAV's motor for driving the propeller rotation is not unlocked. The starting state is the state when the UAV takes off but is not flying in the horizontal direction, or when the horizontal movement distance is small. For example, in the starting state, the UAV moves vertically upwards to a preset height. The cruising state is the state when the UAV is flying in the horizontal direction. For example, in the cruising state, the UAV is at a relatively great distance from the takeoff or landing point/location. The returning state is the state when the UAV is flying back to the takeoff location or towards the landing location. For example, in the returning state, the UAV is at a relatively close distance to the takeoff or landing location, such as within ten meters.

For instance, when the movable platform is in the cruising state, the distance between it and the head-mounted device is greater than or equal to a preset distance threshold. In the stationary state, starting state, or returning state, the distance between the movable platform and the head-mounted device is less than the distance threshold. The preset distance threshold can be 10 meters, though it is not limited thereto.

S220: Based on the operational state of the movable platform, display the first image and/or the second image on the display device of the head-mounted device. The first image is captured by the first photographing device on the head-mounted device, and the second image is captured by the second photographing device on the movable platform.

Referring to FIG. 2, the head-mounted device is equipped with the first photographing device 11, which can capture images within a certain range in front of the head-mounted device. The images captured by the first photographing device 11 can be referred to as the first image. The movable platform is equipped with the second photographing device 12. Exemplarily, the second photographing device 12 is mounted on the movable platform via a gimbal. By adjusting the attitude of the gimbal, the attitude of the second photographing device 12 can be adjusted, thereby adjusting the orientation/direction of the second photographing device 12. The images captured by the second photographing device 12 can be referred to as the second image.

Exemplarily, the display device of the head-mounted device includes one or more display screens, such as a left-eye display screen and a right-eye display screen. For example, the left-eye display screen and the right-eye display screen are monitors with display functions, and their specific shapes and structures are not limited. The left-eye display screen and the right-eye display screen can be LCD screens (liquid crystal displays) or OLED screens (organic light-emitting displays). The specific types of the left-eye display screen and the right-eye display screen can also be other types, and the types of the left-eye display screen and the right-eye display screen can be different from each other. The images displayed on the left-eye display screen and the right-eye display screen are reflected by corresponding optical lenses into the eyes, allowing the user to see the contents displayed on the left-eye display screen and the right-eye display screen. For example, the left eye sees the content displayed on the left-eye display screen, and the right eye sees the content displayed on the right-eye display screen. Due to binocular parallax, a 3D effect can be produced.

In some exemplary embodiments, the displaying of the first image and/or the second image on the display device of the head-mounted device based on the operational state of the movable platform includes at least one of the following: when the movable platform is in the stationary state, displaying the first image on the display device; when the movable platform is in a starting state, displaying the second image on the display device.

Exemplarily, referring to FIG. 3 (where the rectangular box represents a display interface of the display device), when the movable platform is in the stationary state, the head-mounted device defaults to displaying the first image. This allows the user to conduct a safety check of the surroundings, facilitating observation of the external environment, and increasing safety and convenience. For example, the user can understand the positional relationship between the UAV and the user or other objects, allowing for adjustments in the placement of the UAV or other objects, or to remind pedestrians to avoid the area. Exemplarily, the user can adjust the attitude of the head-mounted device, such as by lowering the head, so that the first photographing device can capture the remote control held by the user. This helps the user to check through the first image whether the remote control is being worn correctly.

Exemplarily, when a takeoff instruction is detected and the motor on the UAV for driving the propellers is unlocked, the movable platform enters the starting state.

Exemplarily, referring to FIG. 4 (where the rectangular box represents a display interface of the display device), when the movable platform is in the starting state, the display automatically switches to showing the second image on the display device, such as switching to the aircraft's perspective. For example, by displaying the second image, the user can assess the UAV's status, such as whether the flight is stable or if there is any shaking in the image captured by the second photographing device. Exemplarily, displaying the second image also helps the user observe if there are obstacles near the UAV and understand the positional relationship with those obstacles. For example, if it is determined that there are obstacles in front of the UAV, the user can control the UAV to continue climbing in altitude or moving left/right to avoid the obstacles during flight.

In some exemplary embodiments, based on the operational state of the movable platform, the displaying of the first image and/or the second image on the display device of the head-mounted device also includes the following: when the movable platform is in the starting state, based on the user's viewpoint switching operation, switching from displaying the second image on the display device to displaying the first image, or from displaying the first image to displaying the second image.

In some exemplary embodiments, the viewpoint switching operation includes at least one of the following: a preset head position adjustment, an operation on a preset control element, a preset gesture, or a preset voice. Exemplarily, the head-mounted device can detect the user's head position and map a change in head position to a viewpoint switching operation. For example, lowering the head can trigger a viewpoint switch, such as switching from displaying the second image to displaying the first image on the display device. Exemplarily, the head-mounted device and/or a terminal device such as a remote control can have control elements. When user operation of a preset control element is detected, it determines that a viewpoint switching operation has been detected. Exemplarily, the head-mounted device can detect preset gestures in the first image, such as five fingers spread out. When a preset gesture is detected, it determines that a viewpoint switching operation has been detected. Exemplarily, the head-mounted device and/or terminal device such as a remote control can be equipped with a microphone to collect sound. By detecting whether a preset voice is present in the collected sound, it determines if a viewpoint switching operation has been detected.

Exemplarily, when the movable platform is in the starting state, display can be switched between displaying the second image or the first image based on the user's viewpoint switching operation. This feature helps users better understand the surrounding environment or the environment from the UAV's perspective, thereby increasing the user's sense of safety and enhancing the safety of operating the movable platform.

For example, when a takeoff instruction is detected, the UAV's motors are unlocked, and the head-mounted device automatically switches to the aircraft's perspective/viewpoint to display the second image, allowing the user to assess the UAV's status. Before pushing the throttle control lever to control the UAV for horizontal flight, the viewpoint can be switched again when the user looks down, such as switching to the first image, to help the user observe the UAV's takeoff from a third perspective/viewpoint.

In some exemplary embodiments, based on the operating/operational state of the movable platform, the display device of the head-mounted device shows the first image and/or the second image, including: when the movable platform is in the cruising state or returning state, the display device shows the first image and/or the second image based at least in part on a distance between the movable platform and the head-mounted device. By displaying the first image and/or the second image based at least in part on the distance between the movable platform and the head-mounted device, a user can better control the UAV and understand the environment around the user and/or the UAV, thereby enhancing safety and a sense of safety.

For example, when the movable platform is in the cruising state or returning state, and the distance between the movable platform and the head-mounted device is greater than a first distance threshold, the second image is displayed, and/or when the movable platform is in a cruising state or returning state, and the distance between the movable platform and the head-mounted device is less than the first distance threshold, the first image is displayed.

For example, when the distance between the UAV and the head-mounted device is greater than a first distance threshold with the UAV outside the visual range, the second image captured by the photographing device on the UAV is displayed, allowing the user to experience an immersive flight from the UAV's first-person perspective. For example, the first distance threshold could be 10 meters, though this is not limited to this specific value.

For example, when the distance between the UAV and the head-mounted device is less than the first distance threshold with the UAV within the visual range, the first image captured by the photographing device on the head-mounted device is displayed. This helps the user understand the environment around the user and the positional relationship with the UAV, for example, making real-time adjustments to the UAV's flight direction, speed, and so on, to prevent collisions with obstacles and even potential harm.

Exemplarily, when the UAV returns to a distance from the head-mounted device that is less than 10 meters, the head-mounted device displays the first image, switching to a third-person perspective. This allows the user to observe the surrounding environment, confirm safety, and then control the UAV for a safe landing.

Exemplarily, the method/process for displaying the first image and/or the second image on the display device based on the operational state of the movable platform may also include: when the movable platform is in the cruising state or returning state, the viewpoint can be switched based on the user's viewpoint switching operation. This involves switching from displaying the second image to the first image on the display device, or from displaying the first image to the second image on the display device.

Exemplarily, when the movable platform is in the cruising state or returning state, according to the user's viewpoint switching operation, the display can switch between the second image or the first image. This can help the user to fully understand the environment around the user or the environment from the UAV's perspective, increasing the user's sense of safety and improving the safety of the movable platform's operation. For example, a head shake can trigger the display device to show the first image, and another head shake will switch back to display the second image, i.e., switching back to the aircraft's perspective/viewpoint.

Exemplarily, the control method/process further includes: when the movable platform is in the cruising state or returning state and according to the user's viewpoint switching operation, switching from displaying the second image on the display device to displaying the first image, send a position-holding instruction to the movable platform to keep its position unchanged. When the display device of the head-mounted device switches to display the first image, by maintaining the position of the movable platform, such as by stopping the UAV, it prevents the movable platform from continuing to move and causing loss. It also facilitates the user's quick understanding of the movable platform's posture and the environment around the movable platform when switching back to display the second image, making it easier to continue controlling the movement of the movable platform.

S230. Send a control instruction to the movable platform based on a control operation from a user.

Exemplarily, the user's control operation may include a control operation detected by the head-mounted device and/or a control operation detected by the terminal device such as a remote controller. For example, the user's control operations can include at least one of gesture control operations, voice control operations, or control operations on control elements, though this is not an exhaustive list. Examples of control elements include physical buttons, virtual buttons, or joysticks on the head-mounted device or terminal device.

Specifically, by displaying the first image and/or the second image on the display device of the head-mounted device and sending control instructions to the movable platform based on the user's control operations, the user can understand the environment around the user and/or within the vicinity of the movable platform. This allows the user to perform tasks such as adjusting the platform's attitude through control operations, thereby increasing the user's sense of safety and achieving safe control of the movable platform.

In some exemplary embodiments, the control method/process further includes: detecting whether a preset target area exists in the first image, where the preset target area is used to indicate a target object within the field of view of the first photographing device.

For example, the target object can include at least one of the following: a pedestrian, an animal, a vehicle, a tree, a railing, stairs, or a ramp. It is understood that the target object is an object that poses an obstacle or a safety threat to the user's movement, and it can include both dynamically moving objects and stationary objects.

Referring to FIG. 5 (where the rectangular box in FIG. 5 represents a display interface of the display device); if there is someone passing by at a position L2 away from the user, the preset target area can be detected in the first image captured by the head-mounted device.

Exemplarily, based on the operational state of the movable platform, the display device displays the first image and/or the second image, including: when the movable platform is in the cruising state or returning state, displaying the first image and/or the second image on the display device based on a detection result of whether a preset target area exists in the first image.

Exemplarily, when the movable platform is in the cruising state or returning state, and the distance between the movable platform and the head-mounted device is greater than a first distance threshold, and no preset target area is detected in the first image, the second image is displayed on the display device. For example, when no preset target area is detected in the first image, it can be determined that there are no obstacles or safety threats at least in front of the user, and displaying the first image may not be necessary. By displaying the second image captured by the UAV, the user can experience an immersive flight from the UAV's perspective.

Exemplarily, when the second image is displayed on the display device, and a preset target area is detected in the first image, at least the first image or the preset target area is displayed on the display device. Referring to FIG. 5, when the distance L1 between the UAV and the head-mounted device is greater than the first distance threshold, the display device shows the second image (including trees), allowing the user to experience an immersive flight from the UAV's perspective. When a pedestrian passes by at a position L2 away from the user, at least the preset target area, which indicates the presence of the pedestrian in the field of view of the first photographing device, is displayed on the display device of the head-mounted device. For example, when the preset target area is detected in the first image, it indicates that there are obstacles or safety threats in front of the user. By displaying the first image or the preset target area on the display device, the user is alerted to potential obstacles or safety threats, such as avoiding moving forward to prevent collision with the obstacle.

For example, when the second image is displayed on the display device, and a preset target area is detected in the first image, the second image and either the first image or the preset target area are displayed on the display device. Referring to FIG. 5, the display device on the head-mounted device shows trees captured by the photographing device on the UAV, as well as a pedestrian captured by the photographing device on the head-mounted device. When the preset target area is detected in the first image, displaying the second image and the first image or the preset target area allows the user to experience an immersive flight from the UAV's perspective while also understanding whether the target object in the vicinity is an obstacle or poses a safety threat.

In some exemplary embodiments, the display of the second image, as well as either the first image or the preset target area on the display device includes: when the distance between the target object indicated by the preset target area and the head-mounted device is greater than or equal to a second distance threshold, displaying the second image and either the first image or the preset target area on the display device.

For example, when the distance between the target object and the user is greater than or equal to the second distance threshold, it can be determined that although there is a target object in front of the user, the target object is not close enough to affect the user's movement. In this case, the second image can continue to be displayed on the display device, allowing the user to experience an immersive flight from the UAV's perspective, while simultaneously displaying the first image or the preset target area to help the user understand the spatial relationship between the target object and the position thereof. The second distance threshold can be referred to as a safety distance, for example, 2 meters, but this is not a limitation.

For example, when the distance between the target object indicated by the preset target area and the head-mounted device is greater than or equal to the third distance threshold, the second image is displayed on the display device. When the distance between the target object indicated by the preset target area and the head-mounted device is greater than or equal to the second distance threshold but less than the third distance threshold, the second image and either the first image or the preset target area are displayed on the display device. Herein, the third distance threshold is greater than the second distance threshold. When the distance between the target object and the user is greater than the third distance threshold, it is too far away, so the first image is not displayed to prevent interference with the immersive flight experience for the user.

Exemplarily, the control method/process further includes: when the preset target area is detected in the first image and the distance between the target object indicated by the preset target area and the head-mounted device is greater than or equal to the third distance threshold, outputting a prompt message. The prompt message includes at least one of the following forms of information: text, sound, or vibration. This alerts the user to the presence of a target object at a relatively great distance ahead.

In some exemplary embodiments, displaying the second image on the display device, as well as the first image or the preset target area, includes: adjusting the transparency of the first image or the preset target area, displaying the second image on the display device, and overlaying the first image with adjusted transparency or the preset target area with adjusted transparency onto the second image. By overlaying the first image or the preset target area with adjusted transparency onto the second image, interference with the immersive flight experience for the user can be reduced.

Exemplarily, when adjusting the transparency of the first image or the preset target area, the adjusted transparency is inversely correlated with the distance between the target object indicated by the preset target area and the head-mounted device. The transparency of the image can be indicated by the value of an Alpha channel (a Channel), where lower transparency means the image is more transparent. For example, in a transparency range of 0 to 255, a transparency value of 255 corresponds to fully opaque, while a value of 0 corresponds to fully transparent. For example, the smaller the distance between the target object and the head-mounted device, the less transparent the displayed first image becomes, thus making it more visible to enhance the alerting effect for the user.

In some exemplary embodiments, displaying the second image on the display device, as well as the first image or the preset target area, includes: displaying the second image on the display device, and overlaying the preset target area onto the second image. By overlaying the preset target area corresponding to the target object in part of the second image, the user can simultaneously experience an immersive flight from the UAV's perspective and understand whether the nearby target object is an obstacle or poses a safety threat. Exemplarily, the position of the preset target area overlaid on the second image is the same as the position of the preset target area in the first image, to help the user understand the spatial relationship between the target object and the position thereof.

In some exemplary embodiments, displaying the second image on the display device, as well as the first image or the preset target area, includes: displaying the first image and the second image in different display regions of the display device. This allows the user to simultaneously experience an immersive flight from the UAV's perspective and understand whether nearby target objects are obstacles or pose a safety threat.

Exemplarily, when displaying the first image and the second image in different display regions of the display device, the size of the display region for the first image is inversely correlated with the distance between the target object indicated by the preset target area and the head-mounted device. For example, the smaller the distance between the target object and the head-mounted device, the larger the display region for the first image becomes, making it more noticeable to enhance the alerting effect for the user.

In some exemplary embodiments, displaying the second image on the display device, as well as the first image or the preset target area, includes: when the second image is displayed on the display device and the preset target area is detected in the first image, and the distance between the target object indicated by the preset target area and the head-mounted device is less than the second distance threshold, switching from displaying the second image to displaying the first image on the display device.

For example, when the distance between the target object and the user is less than the second distance threshold, it can be determined that the target object may obstruct the user's movement or pose a safety threat. By switching to display the first image, the user is alerted to avoid the obstacle or safety threat.

Exemplarily, the control method/process further includes: when the movable platform is in the cruising state or returning state, and switch from displaying the second image to displaying the first image on the display device based on the detection result of whether there is a preset target area in the first image, sending a position-holding instruction to the movable platform to maintain its position. When the display device of the head-mounted device switches to display the first image, by maintaining the position of the movable platform unchanged, such as by stopping the UAV, it can prevent the movable platform from continuing to move and causing potential damage. It also allows the user to quickly understand the position and surroundings of the movable platform when switching back to display the second image, making it easier to continue controlling the movement of the movable platform.

Exemplarily, when the distance between the target object and the head-mounted device is relatively far (such as greater than or equal to the third distance threshold), a buzzer alerts the user to the presence of a target object far ahead. As the distance between the target object and the head-mounted device gradually decreases, the transparency of the first image or the preset target area is adjusted inversely to the distance between the target object indicated by the preset target area and the head-mounted device, thereby gradually enhancing the alert to the user. When the distance between the target object and the head-mounted device is relatively close (such as less than or equal to the second distance threshold), the display fully switches to the first image to prevent the user from colliding with the target object and notifies the UAV to stop. For example, a tiered alert system for the protective system can be implemented.

The control method/process for the movable platform provided by this disclosure may include: obtaining the operational state of the movable platform; displaying the first image and/or the second image on the display device of the head-mounted device based on the operational state of the movable platform. The first image is an image captured by the first photographing device on the head-mounted device, and the second image is an image captured by the second photographing device on the movable platform, and sending a control instruction to the movable platform based on a control operation from a user. By displaying the first image and/or the second image on the display device of the head-mounted device and sending the control instruction to the movable platform based on the user's control operation, the user can understand the environment around the user and/or the movable platform, and control the movable platform to perform tasks such as adjusting its position, enhancing the user's sense of safety and achieving safe control of the movable platform.

In some exemplary embodiments, by installing a camera on the head-mounted device with a relatively closed field of view, the perspective can be switched to facilitate the user's observation of the external environment. Additionally, automatic distance judgment of obstacles can be used to send corresponding alerts to the user. This enhances the convenience of using the head-mounted device, such as enclosed goggles, for external observation and increases the user's sense of safety. The viewpoint displayed by the head-mounted device can be linked with the movement state of the movable platform and/or the distance between the movable platform and the head-mounted device to achieve automatic perspective switching. For example, this can solve problems such as the difficulty of UAV takeoff and landing when the user is wearing the head-mounted device; and it can also provide dynamic safety level reminders for the user's surrounding environment.

In some exemplary embodiments, when using the head-mounted device, there is no need to manually set the boundaries of the protection zone, making the use more convenient and flexible. Additionally, it can provide better alerts for the entry of dynamic objects.

Referring to FIG. 7 in conjunction with the above exemplary embodiments, FIG. 7 is a schematic block diagram of the head-mounted device 600 provided by this disclosure. In some exemplary embodiments, the head-mounted device 600 can be applied to the aforementioned control method/ process of the movable platform.

Exemplarily, the head-mounted device 600 includes at least one of augmented reality (AR) glasses, virtual reality (VR) glasses, flight control glasses, smart helmets, smart headbands, and other similar devices.

As shown in FIG. 7, the head-mounted device 600 includes:

A first photographing device 610, capable of capturing a first image;

A communication device 620, for communication with the movable platform and for receiving a second image captured by a second photographing device on the movable platform; and A display device 630, capable of displaying the first image and/or the second image.

The head-mounted device 600 may further include one or more processors 601, which work individually or collectively to execute the steps of the aforementioned control method/process of the movable platform.

Exemplarily, the head-mounted device 600 also includes a memory/storage medium 602.

Exemplarily, the processor 601 and the memory 602 are connected via a bus 603, such as an I2C (Inter-Integrated Circuit) bus.

Specifically, the processor 601 can be a Micro-controller Unit (MCU), Central Processing Unit (CPU), or Digital Signal Processor (DSP), etc.

Specifically, the memory 602 can be a Flash chip, Read-Only Memory (ROM), disk, optical disk, USB flash drive, or portable hard drive, etc.

The processor 601 is used to run computer programs stored in the memory 602 and to implement the steps of the aforementioned control method/process of the movable platform when executing the computer programs. Moreover, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In some exemplary embodiments, the processor 601 is used to run computer programs stored in the memory 602 and, when executing the computer programs, to implement the following steps:

Displaying the first image and/or the second image on the display device of the head-mounted device, where the first image is an image captured by the first photographing device on the head-mounted device and the second image is an image captured by the second photographing device on the movable platform;

When switching from displaying the second image to displaying the first image on the display device, sending a safety operation instruction to the movable platform so that the movable platform performs the corresponding safety operation.

In some exemplary embodiments, when the processor 601 executes the sending of the safety operation instruction to the movable platform to make the movable platform perform the corresponding safety operation, it is used for:

Sending a safety operation instruction to the movable platform to make the movable platform maintain its position, land, or return.

In some exemplary embodiments, when the processor 601 executes the sending of the safety operation instruction to the movable platform when switching from displaying the second image to displaying the first image on the display device, it is used for:

Sending a safety operation instruction to the movable platform when the movable platform is in the cruising state or returning state and when switching from displaying the second image to displaying the first image on the display device.

In some exemplary embodiments, when the processor 601 executes the display of the first image and/or the second image on the display device of the head-mounted device, it is used for:

Switching from displaying the second image to displaying the first image on the display device, or from displaying the first image to displaying the second image on the display device, based on a viewpoint switching operation from a user.

In some exemplary embodiments, the viewpoint switching operation includes at least one of the following: preset head position adjustment, operation on a preset control element, a preset gesture, or a preset voice.

In some exemplary embodiments, when the processor 601 executes the display of the first image and/or the second image on the display device of the head-mounted device, it is used for:

When the movable platform is in the cruising state or returning state, displaying the first image and/or the second image on the display device based on the distance between the movable platform and the head-mounted device.

In some exemplary embodiments, when the processor 601 executes the following as the movable platform is in the cruising state or returning state: based on the distance between the movable platform and the head-mounted device, display a first image and/or a second image on the display device, it is used for:

When the movable platform is in the cruising state or returning state and the distance between the movable platform and the head-mounted device is greater than a first distance threshold, displaying the second image; and/or When the movable platform is in the cruising state or returning state and the distance between the movable platform and the head-mounted device is less than the first distance threshold, displaying the first image.

In some exemplary embodiments, when the processor 601 executes the following as displaying a first image and/or a second image on the display device of the head-mounted device: detecting whether a preset target area exists in the first image, where the preset target area is used to indicate a target object within the field of view of the first photographing device, it is used for:

When the movable platform is in the cruising state or returning state, based on the detection result of the preset target area in the first image, switching from displaying the second image on the display device to displaying the first image.

In some exemplary embodiments, when the processor 601 executes the following as switching from displaying the second image on the display device to displaying the first image based on the detection result of the preset target area in the first image, it is used for:

When the preset target area is detected in the first image, switching from displaying the second image on the display device to displaying the first image.

In some exemplary embodiments, when the processor 601 executes the following as detecting the presence of the preset target area in the first image: switching from displaying the second image to displaying the first image on the display device, it is used for:

When the presence of the preset target area is detected in the first image, and the distance between the target object indicated by the preset target area and the head-mounted device is less than the second distance threshold, switching from displaying the second image to displaying the first image on the display device.

In some exemplary embodiments, when the processor 601 executes displaying the first image and/or the second image on the display device of the head-mounted device, it is used for:

When displaying the second image on the display device, outputting a prompt message based on at least one of the following: the distance between the movable platform and the head-mounted device, the detection result of whether there is a preset target area in the first image, and the distance between the target object indicated by the preset target area and the head-mounted device. This allows the user to perform a viewpoint switching operation based on the prompt message;

When detecting the user's viewpoint switching operation, switching from displaying the second image to displaying the first image on the display device.

In some exemplary embodiments, when the processor 601 executes displaying the second image on the display device based on at least one of the following: the distance between the movable platform and the head-mounted device, the detection result of whether there is a preset target area in the first image, and the distance between the target object indicated by the preset target area and the head-mounted device, it is used for:

When displaying the second image on the display device, if it detects that there is a preset target area in the first image and the distance between the target object indicated by the preset target area and the head-mounted device is greater than or equal to a third distance threshold, outputting a prompt message.

In some exemplary embodiments, when the processor 601 executes displaying the first image and/or the second image on the display device of the head-mounted device, it is used for:

When the movable platform is in a cruising state or returning state, and the distance between the movable platform and the head-mounted device is greater than a first distance threshold, and no preset target area is detected in the first image, displaying the second image on the display device.

In some exemplary embodiments, the processor 601 is further configured to execute the following:

Determining the operational state of the movable platform based on at least one of the first image, the second image, and the sensor data collected by the sensors on the movable platform.

In some exemplary embodiments, the processor 601 is configured to run a computer program(s) stored in the memory 602, and when executing the computer program(s), it performs the following steps:

Obtaining an operational state of a movable platform;

Displaying a first image and/or a second image on a display device of a head-mounted device based on the operational state of the movable platform;

Sending a control instruction to the movable platform based on a control operation from a user. For example, the control instruction can be sent to the movable platform via a communication device 620. Alternatively, the control instruction can be sent to a remote control or other terminal device, which then sends it to the movable platform.

In some exemplary embodiments, when the processor 601 executes displaying the first image and/or the second image on the display device based on the operational state of the movable platform, it is used for:

When the movable platform is in a stationary state, displaying the first image on the display device.

In some exemplary embodiments, when the processor 601 executes displaying the first image and/or the second image on the display device based on the operational state of the movable platform, it is used for:

When the movable platform is in a starting state, displaying the second image on the display device.

In some exemplary embodiments, when the processor 601 executes displaying the first image and/or the second image on the display device based on the operational state of the movable platform, it is used for:

When the movable platform is in a starting state, switching from displaying the second image to displaying the first image, or from displaying the first image to displaying the second image, on the display device based on a viewpoint switching operation from a user.

In some exemplary embodiments, when the processor 601 executes displaying the first image and/or the second image on the display device based on the operational state of the movable platform, it is used for: when the movable platform is in a cruising state or returning state, displaying the first image and/or the second image on the display device based on a distance between the movable platform and the head-mounted device.

In some exemplary embodiments, when the processor 601 executes displaying the first image and/or the second image on the display device when the movable platform is in the cruising state or returning state, based on the distance between the movable platform and the head-mounted device, it is used for: when the movable platform is in the cruising state or returning state, and the distance between the movable platform and the head-mounted device is greater than a first distance threshold, displaying the second image; and/or when the movable platform is in the cruising state or returning state, and the distance between the movable platform and the head-mounted device is less than the first distance threshold, displaying the first image.

In some exemplary embodiments, when the processor 601 executes displaying the first image and/or the second image on the display device based on the operational state of the movable platform, it is used for: when the movable platform is in the cruising state or returning state, switching from displaying the second image to displaying the first image, or from displaying the first image to displaying the second image, on the display device based on a viewpoint switching operation from a user.

In some exemplary embodiments, the processor 601 is further configured to execute the following: when the movable platform is in the cruising state or returning state, and switching from displaying the second image to displaying the first image on the display device based on the user's viewpoint switching operation, sending a position-holding instruction to the movable platform to keep the platform's position unchanged.

In some exemplary embodiments, the viewpoint switching operation includes at least one of the following: a preset head position adjustment; an operation on a preset control element; a preset gesture; or a preset voice.

In some exemplary embodiments, the processor 601 is further configured to execute the following: detecting whether there is a preset target area in the first image, where the preset target area is used to indicate a target object within the field of view of the first photographing device;

When the processor 601 executes displaying the first image and/or the second image on the display device based on the operational state of the movable platform, it is used for: when the movable platform is in the cruising state or returning state, displaying the first image and/or the second image on the display device based on a detection result of whether there is a preset target area in the first image.

In some exemplary embodiments, when the processor 601 displaying the first image and/or the second image on the display device based on the detection result of whether there is a preset target area in the first image, it is used for: when displaying the second image on the display device, if it is detected that there is the preset target area in the first image, displaying at least the first image or the preset target area on the display device.

In some exemplary embodiments, when the processor 601 executes displaying the second image on the display device and detecting the presence of the preset target area in the first image, it is used for: when displaying the second image on the display device and detecting that the preset target area exists in the first image, displaying the second image and either the first image or the preset target area on the display device.

In some exemplary embodiments, when the processor 601 executes displaying the second image and either the first image or the preset target area on the display device, it is used for: when the distance between the target object indicated by the preset target area and the head-mounted device is greater than or equal to a second distance threshold, displaying the second image and either the first image or the preset target area on the display device.

In some exemplary embodiments, when the processor 601 executes displaying both the second image and either the first image or the preset target area on the display device, it is used for: adjusting a transparency of either the first image or the preset target area, displaying the second image on the display device, and overlaying the adjusted transparency version of the first image or the adjusted transparency version of the preset target area on top of the second image;

or displaying the second image on the display device and overlaying the preset target area on top of the second image; or displaying the first image and the second image in different display regions on the display device.

In some exemplary embodiments, when adjusting the transparency of the first image or the preset target area, the adjusted transparency is inversely correlated with a distance between the target object indicated by the preset target area and the head-mounted device; or, when displaying the first image and the second image in different display regions on the display device, the size of the display region for the first image is inversely correlated with the distance between the target object indicated by the preset target area and the head-mounted device.

In some exemplary embodiments, when the processor 601 executes displaying the second image on the display device, and detecting the presence of the preset target area in the first image, displaying at least the first image or the preset target area on the display device, it is used for: when displaying the second image on the display device, and detecting the presence of the preset target area in the first image, and the distance between the target object indicated by the preset target area and the head-mounted device is less than a second distance threshold, switching from displaying the second image on the display device to displaying the first image.

In some exemplary embodiments, the processor 601 is also configured to perform the following: when the movable platform is in the cruising state or returning state, and switching from displaying the second image on the display device to displaying the first image based on a detection result of whether a preset target area exists in the first image, sending a position-holding instruction to the movable platform to maintain its position.

In some exemplary embodiments, when the processor 601 executes, when the movable platform is in the cruising state or returning state, displaying the first image and/or the second image on the display device based on the detection result of whether a preset target area exists in the first image, it is used for: when the movable platform is in the cruising state or returning state, the distance between the head-mounted device and the movable platform is greater than a first distance threshold, and the preset target area is not detected in the first image, displaying the second image on the display device.

In some exemplary embodiments, the processor 601 is also configured to perform the following: when the presence of the preset target area is detected in the first image and the distance between the target object indicated by the preset target area and the head-mounted device is greater than or equal to a third distance threshold, outputting a prompt message. The prompt message includes at least one of the following forms of information: text, sound, or vibration.

The specific principles and implementation methods of the head-mounted device provided in the embodiments of this disclosure are similar to the control method/process for the movable platform in the aforementioned embodiments, and will not be repeated herein.

It is further noted that the processes disclosed in the present disclosure may be executed by other devices than the head-mounted device described above, for example, the processes may be executed by terminal devices such as remote controls/mobile phones, etc. In some exemplary embodiments, the terminal device may includes a communication device configured to communicate with a head-mounted device, where the head-mounted device is configured to communicate with a movable platform; at least one storage medium storing at least one set of instructions; and at least one processor in communication with the at least one storage medium; during operation, the at least one processor executes the at least one set of instructions to cause the terminal device to at least: control a display device of the head-mounted device to display at least one of a first image or a second image, where the first image is an image captured by a photographing device on the head-mounted device, and the second image is an image captured by a photographing device on the movable platform, and in response to the display device switching from displaying the second image to displaying the first image, generate a safety operation instruction to enable the movable platform to perform a corresponding safety operation.

The embodiments of this disclosure also provide a computer-readable storage medium that stores a computer program(s), where the execution of the computer program(s) by a processor(s) enables the processor(s) to perform the steps of the movable platform control method/process provided in the aforementioned exemplary embodiments.

The computer-readable storage medium can be an internal storage unit of the head-mounted device described in any of the aforementioned exemplary embodiments, such as a hard drive or memory of the head-mounted device. The computer-readable storage medium can also be an external storage device for the head-mounted device, such as a plug-in hard drive, a Smart Media Card (SMC), a Secure Digital (SD) card, or a Flash Card equipped on the head-mounted device.

Figure 8:
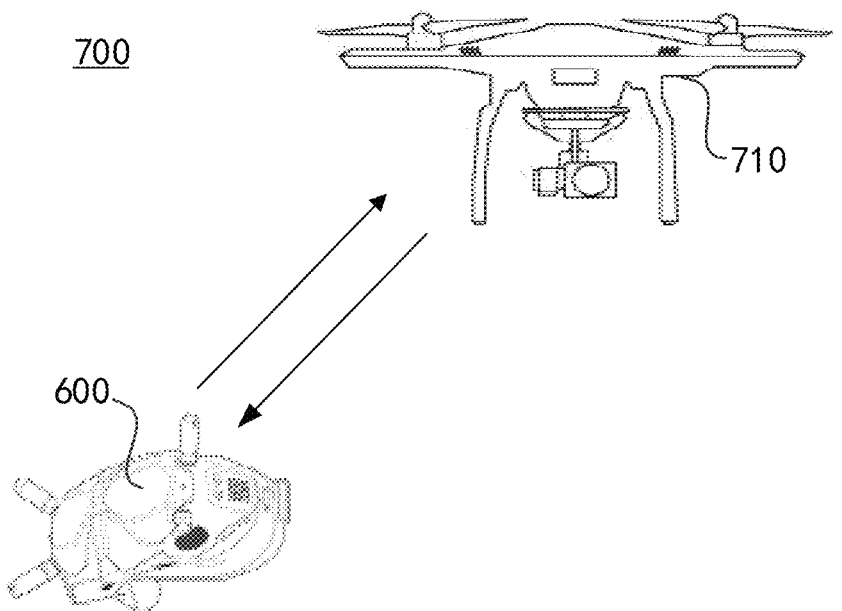
FIG. 8 is a schematic block diagram of a movable platform according to some exemplary embodiments of the present disclosure.

Referring to FIG. 8 in conjunction with the aforementioned exemplary embodiments, FIG. 8 shows a schematic diagram of a movable platform system 700 provided according to some exemplary embodiments of this disclosure. The movable platform system 700 includes a movable platform 710 and the aforementioned head-mounted device 600.

Exemplarily, the head-mounted device 600 includes at least one of the following: Augmented Reality (AR) glasses, Virtual Reality (VR) glasses, flight control glasses, smart helmets, or smart headbands.

Exemplarily, the movable platform 710 includes at least one of the following: UAVs (Unmanned Aerial Vehicles), unmanned vehicles, or unmanned boats. Further, the UAV can be a rotorcraft, such as a quadcopter, hexacopter, or octocopter, or it can be a fixed-wing UAV.

The head-mounted device 600 is capable of communicating with the movable platform 710. Exemplarily, data can be transmitted between the head-mounted device 600 and the movable platform 710 through a wireless channel.

In some exemplary embodiments, the movable platform system 700 also includes a terminal device, and data transmission between the head-mounted device 600 and the movable platform 710 can be performed via the terminal device. Exemplarily, the terminal device includes at least one of the following: a mobile phone, a tablet, a laptop, or a remote control. For example, data collected by the movable platform 710 can be transmitted to the terminal device, which then sends the data to the head-mounted device 600 via a prioritized or wireless connection. Conversely, data from the head-mounted device 600 can be sent to the terminal device, which then transmits the data to the movable platform 710.

The specific principles and implementation methods of the movable platform system provided in the embodiments of this disclosure are similar to the control method/process for the movable platform in the aforementioned exemplary embodiments, and will not be repeated herein.

It should be understood that the terms used in this disclosure are merely for the purpose of describing specific embodiments and are not intended to limit this disclosure.

It should also be understood that the term "and/or" used in this disclosure and the appended claims refers to any combination of one or more of the listed items and all possible combinations thereof, including these combinations.

It should be noted that in the embodiments of this disclosure, terms such as "first," "second," etc., are used for descriptive purposes only and should not be interpreted as indicating or implying relative importance or implicitly specifying the number of technical features referred to. Thus, features defined as "first," "second," etc., may explicitly or implicitly include at least one such feature.

The above descriptions are only some specific embodiments of this disclosure, but the scope of protection of this disclosure is not limited to this. A person skilled in the art, within the technical scope disclosed in this disclosure, can easily think of various equivalent modifications or substitutions, and these modifications or substitutions should be included within the scope of protection of this disclosure. Therefore, the scope of protection of this disclosure should be determined by the scope of the claims.

What is claimed is:

1. A control method for a movable platform, comprising:
controlling a display device of a head-mounted device to display at least one of a first image or a second image, wherein the head-mounted device is in communication with the movable platform, the first image is captured by a first photographing device on the head-mounted device, and the second image is captured by a second photographing device on the movable platform; and
in response to occurrence of a viewpoint switching operation to the head-mounted device, switching the display device from displaying the second image to displaying the first image and rendering the movable platform to perform a corresponding safety operation.

2. The control method according to claim 1, wherein the corresponding safety operation comprises at least one of maintaining a position of the movable platform, maintaining an attitude of the movable platform, stopping, or returning.

3. The control method according to claim 1, wherein the rendering of the movable platform to perform the corresponding safety operation comprises:
in response to the movable platform being in a cruising state or a returning state and the display device switching from displaying the second image to displaying the first image, generating a safety operation instruction for the movable platform to perform the corresponding safety operation.

4. The control method according to claim 1, further comprising:
in response to occurrence of the viewpoint switching operation, controlling the display device to switch from displaying the first image to displaying the second image.

5. The control method according to claim 4, wherein the viewpoint switching operation comprises at least one of a preset head position adjustment, an operation on a preset control element, a preset gesture, or a preset voice.

6. The control method according to claim 1, wherein the controlling of the displaying device of the head-mounted device to display at least one of the first image or the second image comprises:
during a cruising state or a returning state of the movable platform, controlling the display device to display at least one of the first image or the second image based at least in part on a distance between the movable platform and the head-mounted device.

7. The control method according to claim 6, wherein the controlling of the display device to display at least one of the first image or the second image based at least in part on the distance between the movable platform and the head-mounted device comprises:
in response to the distance between the movable platform and the head-mounted device being greater than a first distance threshold, displaying the second image; or
in response to the distance between the movable platform and the head-mounted device being less than or equal to a first distance threshold, displaying the first image.

8. The control method according to claim 1, wherein the controlling of the displaying device of the head-mounted device to display at least one of the first image or the second image comprises:
during a cruising state or a returning state of the movable platform, in response to determining that a preset target area is present in the first image, controlling the display device to switch from displaying the second image to displaying the first image, wherein
the preset target area indicates a target object within a field of view of the first photographing device on the head-mounted device.

9. The control method according to claim 8, wherein in response to determining that the preset target area is present in the first image, the controlling of the display device to switch from displaying the second image to displaying the first image comprises:
in response to determining that the preset target area is present in the first image and that a distance between the target object indicated by the preset target area and the head-mounted device is less than or equal to a second distance threshold, controlling the display device to switch from displaying the second image to displaying the first image.

10. The control method according to claim 1, wherein the controlling of the displaying device of the head-mounted device to display at least one of the first image or the second image comprises:
outputting a prompt message based at least in part on at least one of: a distance between the movable platform and the head-mounted device, a presence of a preset target area in the first image, or a distance between a target object indicated by the preset target area and the head-mounted device, so as to facilitate performing a viewpoint switching operation based at least in part on the prompt message.

11. The control method according to claim 10, wherein the outputting of the prompt message based at least in part on at least one of: the distance between the movable platform and the head-mounted device, the presence of the preset target area in the first image, or the distance between the target object indicated by the preset target area and the head-mounted device comprises:
outputting the prompt message upon determining that the preset target area is present in the first image and the distance between the target object indicated by the preset target area and the head-mounted device is greater than or equal to a third distance threshold.

12. The control method according to claim 1, wherein the controlling of the displaying device of the head-mounted device to display at least one of the first image or the second image comprises:

controlling the display device to display the second
image, when the movable platform is in a cruising state
or a return state, a distance between the movable
platform and the head-mounted device is greater than a
first distance threshold, and no preset target area is
present in the first image.
13. The control method according to claim 1, further
comprising:
determining an operational state of the movable platform,
wherein the controlling of the displaying device of the
head-mounted device to display at least one of the first
image or the second image comprises:
controlling the display device to display at least one of the
first image or the second image based at least in part on
the operational state of the movable platform.
14. The control method according to claim 13, wherein
the determining of the operational state of the movable
platform comprises:
determining the operational state of the movable platform
based at least in part on at least one of the first image,
the second image, or sensor data collected by at least a
sensor on the movable platform.
15. The control method according to claim 13, wherein
the controlling of the display device to display at least one
of the first image or the second image based at least in part
on the operational state of the movable platform comprises:
when the movable platform is in a stationary state, con-
trolling the display device to display the first image; or
when the movable platform is in a starting state, control-
ling the display device to display the second image.
16. The control method according to claim 13, wherein
the controlling of the display device to display at least one
of the first image or the second image based at least in part
on the operational state of the movable platform comprises:
when the movable platform is in the starting state, in
response to the viewpoint switching operation, control-
ling the display device to switch from displaying the
second image to displaying the first image, or from
displaying the first image to displaying the second
image.
17. The control method according to claim 1, wherein the
controlling of the displaying device of the head-mounted
device to display at least one of the first image or the second
image comprises at least one of:
adjusting a transparency of the first image or a transpar-
ency of the preset target area, controlling the display
device to display the second image, and overlaying the
first image with adjusted transparency or the preset
target area with adjusted transparency on top of the
second image; or
controlling the display device to display the second
image, and overlaying the preset target area on top of
the second image; or
respectively displaying the first image and the second
image in different display areas of the display device.
18. The control method according to claim 17, wherein
during the adjusting of the transparency of the first image
or the transparency of the preset target area, the adjusted transparency is inversely correlated with a
distance between the target object indicated by the
preset target area and the head-mounted device; or
during the respectively displaying of the first image and
the second image in different display areas of the
display device, a size of the display area of the first
image is inversely correlated with a distance between
the target object indicated by the preset target area and
the head-mounted device.
19. A terminal device, comprising:
a communication device configured to communicate with
a head-mounted device, wherein the head-mounted
device is configured to communicate with a movable
platform;
at least one storage medium storing at least one set of
instructions; and
at least one processor in communication with the at least
one storage medium, wherein during operation, the at
least one processor executes the at least one set of
instructions to cause the terminal device to at least:
control a display device of the head-mounted device to
display at least one of a first image or a second image,
wherein the first image is captured by a first photo-
graphing device on the head-mounted device, and the
second image is captured by a second photographing
device on the movable platform, and
in response to occurrence of a viewpoint switching opera-
tion to the head-mounted device, switching the display
device from displaying the second image to displaying
the first image and rendering the movable platform to
perform a corresponding safety operation.
20. A head-mounted device, comprising:
a first photographing device on the head-mounted device,
configured to capture a first image;
a communication device, configured to communicate with
a movable platform to receive a second image captured
by a second photographing device on the movable
platform;
a display device, configured to display at least one of the
first image or the second image;
at least one storage medium storing at least one set of
instructions; and
at least one processor in communication with the at least
one storage medium, wherein during operation, the at
least one processor executes the at least one set of
instructions to cause the head-mounted device to at
least:
control the display device of the head-mounted device to
display at least one of the first image or the second
image, and
in response to occurrence of a viewpoint switching opera-
tion to the head-mounted device, switching the display
device from displaying the second image to displaying
the first image and rendering the movable platform to
perform a corresponding safety operation.

* * * * *